United States Patent Office 3,013,023
Patented Dec. 12, 1961

---

3,013,023
PROCESS FOR THE PRODUCTION OF
5-NITROFURYL ACRYLIC ACID
Ryuzo Ueno, 65 Nangocho, Nishinomiya,
Hyogoken, Japan
No Drawing. Filed Dec. 30, 1959, Ser. No. 862,770
Claims priority, application Japan Feb. 27, 1959
4 Claims. (Cl. 260—347.3)

This invention relates to a process for the production of 5-nitrofuryl acrylic acid.

Processes for the production of 5-nitrofuryl acrylic acid by nitration of furyl acrylic acid are hitherto described in the Journal of the American Chemical Society, vol. 52, p. 2553 (1930) as well as in the Journal of the Pharmaceutical Society Japan, vol. 73, p. 1136 (1953) and vol. 76, p. 211 (1956) etc. However, all of these processes give only a yield of 40–58% of the aimed product due to extreme instability of the furan nucleus and to high ability of polymerization of the side chain acrylic group. Further, in the prior processes, there is used a large excess of fuming nitric acid or 80% nitric acid amounting to about 4–6 mol. per mol. of said acrylic acid in order to suppress the side reactions such as oxidation, ring fission, polymerization etc. of furyl acrylic acid as much as possible. Use of lower quantity of the nitric acid results in a rapid lowering in the yield, as compared to the above-mentioned case. Because of using such a large excess of concentrated nitric acid, there is often presented in commercial practice of the prior processes a risk that sudden firing or chain reaction of decomposition takes place during the reaction or during the after-treatment of the reaction mixture, leading to an explosion. Besides, acetic anhydride which is the reaction solvent is employed also in a large amount about 6–8 mol. per mol. of furyl acrylic acid in the prior art to suppress the side reactions. However, the requirements for such large quantities of nitric acid and acetic anhydride involve in a notorious trouble and difficulty in their recovery processes, so that commercial practice of the prior art is very disadvantageous. Furthermore, in a process which was invented by me and granted under Japanese Patent No. 190,692, the yield of the aimed product can be increased compared to the previous processes by adding phosphoric acid, boric acid, arsenic acid or anhydride thereof as a catalyst in the nitration reaction. However, this process also cannot succeed in reducing the quantities of nitric acid and acetic anhydride used to a considerable extent and the aforesaid drawbacks cannot be yet eliminated.

With a view to eliminate these drawbacks of the prior processes, I laboriously repeated many researchs and have completed the present invention. The present invention is characterized by this that in nitration of furyl acrylic acid in acetic anhydride by means of concentrated nitric acid or fuming nitric acid, there is added one or more substances which is inert, incombustible, volatile and soluble in acetic anhydride. According to the invention, it is sufficient only to use about 2 mol. of concentrated nitric acid (98%) per mol. of the acrylic acid by effecting the nitration of the furyl acrylic acid in the addition of the above-mentioned substance. Accordingly, the process of the invention employs only an amount of nitric acid which is slightly one-third or one-fourth of the quantity of nitric acid previously used, and the above-mentioned side-reactions and the risk of explosion may be entirely eliminated, also accompanied by the yield of the aimed product increased to higher order of 65–75% of the theoretical. According to the invention, the quantity of acetic anhydride used may be also decreased to about 4 mol. per mol. of furyl acrylic acid, so that the recovery of acetic anhydride and nitric acid becomes easy, coupled with a reduction in the quantity of nitric acid used. Thus, there is obtained an advantage that remarkably promotes commercial practice of the present invention.

As stated in the above, the present invention comprises effecting the nitration of furyl acrylic acid in the presence of the substance which is inert, incombustible, volatile and soluble in acetic anhydride. For such substance, for example, carbon tetrachloride, chloroform, ethane tetrachloride, ethane tetrabromide, trichlorobenzene, diphenylether, dichlorodiphenylether, ethane dichloride, ethylenetrichloride, propantrichloride and butylchloride, may be used. Mechanism of function of these substances cannot yet be explained but it is sure that judging from the characteristic effect of the invention that each substance suppresses the decomposition and polymerization of furyl acrylic acid, largely reduces the required quantity of concentrated nitric acid, represses firing and chain reactions and does not afford an opportunity of explosion. These substances are not a mere reaction medium or diluent. It is necessary for these substances to be particularly inert to concentrated nitric acid and not to be affected by said acid during the reaction. Furthermore, said substances must be of volatility to be recovered by distillation after the reaction has been completed. In these volatile substances, such a substance as to evaporate in the form of an azeotropic mixture with acetic anhydride is also included. These substances may be used as single one or in a mixture of two or more. Moreover, it is advantageous that the concentrated nitric acid employed in the nitration is substantially free from water, as in 98% nitric acid or fuming nitric acid. According to the present invention, it is further possible to simultaneously add as a catalyst an acidic dehydrating agent such as concentrated sulfuric acid, para-toluene sulfonic acid, phosphoric acid, phosphoric anhydride etc., in addition to the known concentrated nitric acid or fuming nitric acid and acetic anhydride as well as the aforesaid additional substance, whereby the side-reactions are further suppressed and the risk of explosion is also reduced. The above-mentioned additional substance is added to the reaction solution through a proper means as meets to the purpose. For instance, it is advantageous to take such a means in which, as illustrated in the undermentioned examples, after an amount of concentrated nitric acid is added to a liquid mixture of acetic anhydride, the additional substance and others, finely-divided furyl acrylic acid is added thereto a little at a time to react at a temperature lower than 0° C. and thereafter the crystals of the aimed product are filtered out. Excesses of nitric acid, acetic anhydride and the additional substance are recovered from the residual mother liquor freed from the aimed product.

Thus, by the addition of the above-mentioned substance, the present invention cannot only suppress the side-reactions and increase the yield of the aimed product beyond the common knowledge that the additional substance would be considered to be a reaction solvent or diluent, but also can reduce the required amount of concentrated nitric acid to an amount which is approximately one-third of the previously required quantity of the acid, so that it becomes able to especially prevent unexpected accident of explosion from occurring. The present invention, therefore, should be said to be of outstanding importance in the industry.

*Example 1*

10 parts of 98% nitric acid (2.18 molar proportions) are dropwise added at a temperature below −7° C. to a liquid mixture of 30 parts of acetic anhydride (4.05 molar proportions, 20 parts of carbon tetrachloride and 5 parts of phosphoric acid while being cooled under stirring.

10 parts of finely-divided furyl acrylic acid of a melting point of 139–140° C. (1 molar proportion) are added a little at a time to the resulting mixture while being further cooled to −13∼−9° C. under stirring and then the stirring is continued for about 30 minutes, after which the crystals of 5-nitrofuryl acrylic acid formed are filtered. When the crystals are washed with water and dried, 9.5 parts of highly pure 5-nitrofuryl acrylic acid of a decomposition point of 233.8° C. are obtained. Yield 71.6% on the theoretical. Throughout the whole course of this reaction, there is not observed any tendency to explode, such as firing or sudden elevation in temperature etc., which has been previously involved, and an extremely safe operation can be made.

*Example 2*

0.1 part of paratoluene sulphonic acid are further added to a liquid mixture used in Example 1 and the reaction mixture is subsequently treated in a similar way to Example 1. 9.9 parts of 5-nitrofuryl acrylic acid of a decomposition point of 233.8° C. are obtained. Yield 75%. Approximately similar result is obtained also when a few drops of 96% concentrated sulphuric acid or 0.1 part of acetic anhydride are added instead of the above-mentioned sulphonic acid.

*Example 3*

Trichlorobenzene is used instead of the carbon tetrachloride present in the liquid mixture of Example 1 and the reaction mixture is then treated in a similar way to Example 1. 8.7 parts of 5-nitrofuryl acrylic acid of a decomposition point of 233.5° C. are obtained. Yield 65.6%.

*Example 4*

5 parts of ethane tetrachloride are further added to the liquid mixture of Example 1 and the reaction mixture is then treated in a similar way to Example 1. 9.9 parts of 5-nitrofuryl acrylic acid of a decomposition point of 233.8° C. are obtained. Yield 75%.

What I claim is:

1. A process for the production of 5-nitrofuryl acrylic acid by nitration of furyl acrylic acid in acetic anhydride with nitrating agent selected from the group consisting of concentrated nitric acid and fuming nitric acid in which said nitration is carried out in the presence of an additional substance selected from the group consisting of carbon tetrachloride, chloroform, ethane tetrachloride, ethane tetrabromide, trichlorobenzene, diphenylether, dichlorodiphenylether, ethane dichloride, ethylenetrichloride, propantrichloride and butyl chloride, the additional substance being inert, incombustible, volatile, soluble in acetic anhydride and making furyl acrylic acid and 5-nitro-furylacrylic acid insoluble.

2. A process as claimed in claim 1, wherein an acidic dehydrating agent selected from the group consisting of phosphoric acid, boric acid, arsenic acid and anhydrides thereof is added to the mixture.

3. A process claimed in claim 1 which comprises conducting the nitration employing about 2 molecules of nitric acid per molecule of furyl acrylic acid.

4. A process as claimed in claim 1 in which concentrated nitric acid is added to a liquid mixture of acetic anhydride and the additional substance, finely divided furyl acrylic acid is a little at a time added to the resulting mixture at a temperature lower than 0° C. and the crystals of the aimed product formed is recovered from the mother liquor.

References Cited in the file of this patent

Gilman et al.: J. Am. Chem. Soc., 52 (1930), pages 2550–4.

Inoue et al.: Chem. Absts., vol. 47, column 9, 365d (1953).

Saikachi et al.: Chem. Absts., vol. 48, column 12072 (1954).

Migrdichian: Organic Synthesis, vol. II (Reinhold Pub. Co., 1957), pages 1588–91.